Jan. 11, 1927.

A. W. FORBES 1,614,292

INDUCTION MOTOR FOR GRINDING MACHINES AND THE LIKE

Filed Nov. 19, 1923   2 Sheets-Sheet 1

Inventor
Allan W. Forbes
By Attorneys.
Southgate Southgate.

Jan. 11, 1927.

A. W. FORBES 1,614,292

INDUCTION MOTOR FOR GRINDING MACHINES AND THE LIKE

Filed Nov. 19, 1923    2 Sheets-Sheet 2

Inventor
Allan W. Forbes
By attorneys.
Southgate & Southgate.

Patented Jan. 11, 1927.

1,614,292

UNITED STATES PATENT OFFICE.

ALLAN W. FORBES, OF WORCESTER, MASSACHUSETTS.

INDUCTION MOTOR FOR GRINDING MACHINES AND THE LIKE.

Application filed November 19, 1923. Serial No. 675,480.

This invention relates to an induction motor adapted to be used directly connected to a grinding wheel or other rotary device to give access to the wheel from both sides. For that purpose I cut away the core on one side so that the wheel on the motor shaft can project beyond the periphery of the core. This involves the unbalancing of the windings and this invention provides means whereby the same can be rebalanced so as to produce a uniformly rotating field.

Reference is to be had to the accompanying drawings, in which—

In the three-phase induction motor three wires pass to the three series of coils on the core, one for each of the wires coming from the source of the three-phase current. Ordinarily these several coils magnetize the core successively around the circumference, thereby producing a uniformly rotating field to operate the rotor. For the purpose of leaving a space at one side of the core free for the workman to hold his tools or work, I omit the coils at that point and shift them in such a way as to secure a balanced construction and provide a substantially uniformly rotating field as before.

Figure 1:
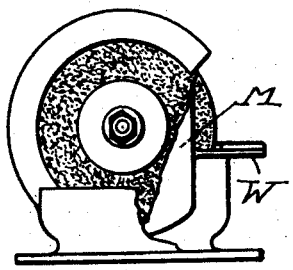
Fig. 1 is an end view of a grinder having two wheels on the ends of the shaft and a fixed core surrounding the shaft and constructed in accordance with this invention.
Figure 2:
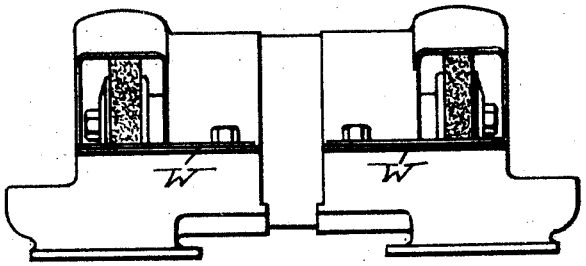
Fig. 2 is a front view of the same.
Figure 3:
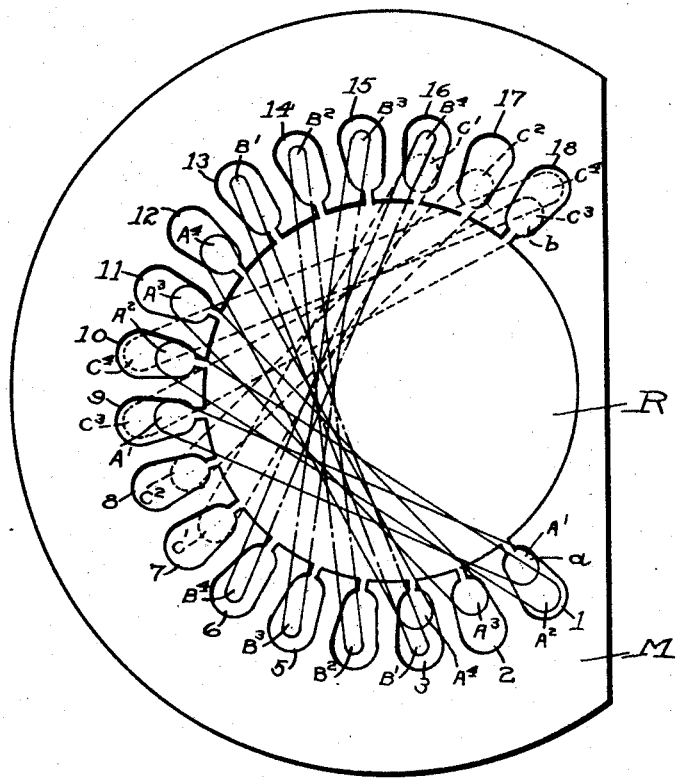
Fig. 3 is a transverse sectional view of the core.

It will be seen from reference to Figs. 1, 2 and 3 that the instrument has the usual rotor R and is of substantially the usual form except that the magnetic core M, which is made up of laminated plates as usual, is of segmental shape having one side cut off so to speak and left flat without interfering with the shape of the rest of the circle. At this point there are two rests W arranged horizontally and acting as a work rest. The object is to enable the operator to pass a piece of work along the wheel and beyond the adjacent end of the motor even when the wheel is of smaller diameter than the core. The core being cut back at this point permits that to be done. This, however, would destroy the uniformity of the rotating field if the coils at this point were simply omitted. In Fig. 3 I have shown a cross-section of the magnetic field in which the core is provided with numerous slots numbered from 1 to 18 in which the coils of wire are contained. These are spaced apart around a portion of the circumference of the core.

One of the objects of my invention is to provide an arrangement by which the coils that are apparently omitted in Fig. 3 can be placed elsewhere and spaced properly to preserve a substantially uniformly rotating field.

In the ordinary motor there are three sets of coils equally spaced apart around the core. Two of these sets of coils are left substantially in the position which they ordinarily occupy. These two sets are fed from the wires $a$ and $c$. They are, however, somewhat modified. The slots in Fig. 3 are numbered from 1 to 18 inclusive. The $a$ coils, $A'$, $A^2$, $A^3$, and $A^4$, extend through the slots 1, 2 and 3 and the slots 9, 10, 11 and 12. They are uniformly arranged in the latter four slots but slot numbered 1 receives two of these coils, that extending into the slot 9 and that extending into the slot 10.

A similar arrangement is made for the coils connected with wire $c$. Here the end slot 18 receives two coils marked $C^4$ and $C^3$ one complete coil extending to the slot 10 and one to the slot 9. These two slots therefore contain two coils of wires each. The coil $C^2$ in the slot 17 extends to the slot 8 while the coils $C'$ in the slot 16 extends to the slot 7. So, in this case as in the case of the $a$ coils, there are four slots 7, 8, 9, and 10 for receiving these four coils. This, therefore, is symmetrical with respect to the coils $A'$, $A^2$, $A^3$, and $A^4$, which is arranged in the same way but the slots 9 and 10 contain two coils each.

Now if the old form of wiring were maintained there would be slots beyond each of the slots 1 and 18 for the extra coils of the wires $a$ and $c$. The third series $b$ which I have designated $B'$, $B^2$, $B^3$, and $B^4$, are wound in the slots 3, 4, 5, and 6 on one side and 13, 14, 15 and 16 on the other side. They are symmetrically arranged with respect to the other coils. In this case there is no crowding of the wires into one slot except that the end slots which receive a part of the coils from wire $b$ also receive part of the coils from wire $a$ on one side and from wire $c$ on the other.

I have also found that in this balancing it is desirable to have fewer turns in the $b$ coils than in the $a$ and $c$ coils and I have found by experiment that it provides a substantially balanced construction to have each of the $a$ and $c$ coils contain 100 wires and the $b$ coils 85 for a motor of certain capacity. In this way it will be seen that the slots 1, 9, 10 and 18 contain 200 wires, the slots 3 and 16, 185 wires, the slots 4, 5, 6, 13, 14 and 15, 85 wires and the rest of the slots 100 wires or convolutions. These numbers of turns are not an essential feature of this invention but I am describing them to show a practical way in which the invention can be applied.

Figure 4:
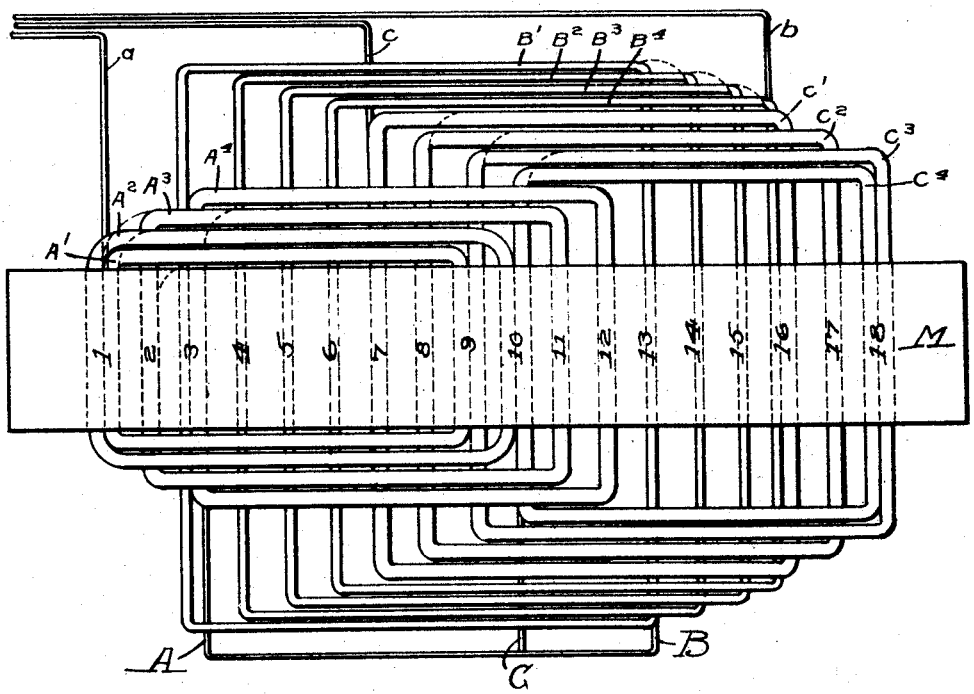
Fig. 4 is a diagrammatic view of the winding.

Now, referring to Fig. 4 which shows in diagrammatic form the coils on the core, it will be seen that I have shown three cables designated $a$, $b$, and $c$, at the top for receiving the three parts of the three-phase current. A wire $a$ passes to the slot 1. One hundred turns are then introduced through slots 1 and 9. When the one hundred turns are all introduced the last turn is brought over to slot 10 and one hundred turns laid in slots 1 and 10. Then the last turn is brought over to slot 2, one hundred turns laid in slots 2 and 11 and then one hundred turns in slots 3 and 12 and finally the wire is led out from this coil at A.

Then the second phase wire coming in from the supply cable at $c$ passes into the slots 7 and 16. A coil of 100 wires is laid in the core in slots 7 and 16 and then another connected coil of one hundred turns in slots 8 and 17. Then it passes over into slot 9 and slots 9 and 18 are connected by a coil of one hundred turns, then slots 10 and 18 by another coil of one hundred turns, and finally the wire comes out from the latter at C. The wires are so laid and connected that the current $a$ and $c$ groups of coils flows in the same direction around all of them. In the $b$ group which is out of its normal place the direction is reversed.

The third set of wires entering at $b$ pass to a slot 16. Eighty-five turns are then laid in slots 16 and 6 to form this coil, then the wire is taken across to slot 15 and around from 15 to 5, eighty-five wires being laid there. Then it passes over to slot 14 and eighty-five wires laid in slots 14 and 4, then over to slot 13 and the same number placed in slots 13 and 3, and out at B. The three wires A, B and C constituting the ends of the three groups of coils are connected together in the usual manner in three-phase motors.

It will be seen that the three conductors of the three-phase current are divided up into groups of several coils placed near each other and that instead of these coils being arranged with the customary regularity they are modified somewhat to compensate for the fact that all of them, so to speak, are on one side of the motor and that in some cases two coils pass through the same slot. In other words they are crowded together at certain points. This compensation is secured by changing the spacing of the coils and by altering the number of turns in the individual coils as has been explained above. The current passes through the several slots in this order 1 and 9, 1 and 10, 2 and 11, 3 and 12 for the wires $a$; 16 and 6, 15 and 5, 14 and 4, 13 and 3 for the wires $b$, 7 and 16, 8 and 17, 9 and 18, 10 and 18 for the wires $c$. Then 9 and 1 etc. in the next cycle.

The particular number of turns as stated is not an essential part of the invention, the selection being made by trial to produce as nearly as possible a uniformly rotating magnetic field for each particular motor. I do not wish to be limited to three-phase motors as the same principle can be applied to two-phase or single phase motors or motors with more than three groups of coils but in any case certain coils are removed from their usual place in which they would be symmetrically located and this removal is compensated for by altering the regular spacing of the remaining coils and the number of turns therein and by placing the removed coils in a different position. The practical result of securing a construction in which the motor itself does not interfere with the work or tools of the operator is an advantage which has proved to be important.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I claim is:—

1. The combination with a shaft, a rotor and a wheel fixed on said shaft, of a stationary magnet surrounding the shaft and having a flat side at the front located materially back of the surface of the wheel and a work rest located adjacent to said flat side.

2. An induction motor comprising a magnet, core and rotor, part of the circumference of the core being free from coils, the core being cut away at that point to leave a segmental space, and the coils the rest of the way around the circumference being arranged in the form of bundles of insulated wires crossing each other at the ends of the magnet to compensate partially for the absence of coils on one part of the circumference.

3. A three-phase induction motor having a plurality of series of coils, those connected with two phases of the circuit being arranged in a substantially symmetrical manner but crowded together at one end of each series of coils and having a third coil extending across the motor on the opposite side of each and of a smaller number of turns than the other coils.

4. In an induction motor, the combination with a rotor of a core surrounding the rotor and having a series of slots for coils, said series extending around the rotor except on one side, two groups of coils extending from substantially the center slots of the series respectively to slots near the ends of said series, a third group of coils extending across the spaces between the two ends of the series of slots and the center thereof, and means for connecting the coils with a three phase circuit.

In testimony whereof I have hereunto affixed my signature.

ALLAN W. FORBES.